United States Patent
Johnson

(10) Patent No.: US 12,188,618 B2
(45) Date of Patent: Jan. 7, 2025

(54) CALIBRATED GAUGE TOOL FOR CHECKING PRESSURES ON INSTALLED INERT SYSTEMS PER NFPA

(71) Applicant: KIDDE-FENWAL, LLC, Ashland, MA (US)

(72) Inventor: Paul M. Johnson, Clinton, MA (US)

(73) Assignee: KIDDE-FENWAL, LLC, Ashland, MA (US)

(*) Notice: Subject to any disclaimer, the term of this patent is extended or adjusted under 35 U.S.C. 154(b) by 802 days.

(21) Appl. No.: 17/252,647

(22) PCT Filed: Sep. 17, 2019

(86) PCT No.: PCT/US2019/051381
§ 371 (c)(1),
(2) Date: Dec. 15, 2020

(87) PCT Pub. No.: WO2020/060961
PCT Pub. Date: Mar. 26, 2020

(65) Prior Publication Data
US 2021/0270422 A1    Sep. 2, 2021

Related U.S. Application Data

(60) Provisional application No. 62/732,137, filed on Sep. 17, 2018.

(51) Int. Cl.
*A62C 37/50*    (2006.01)
*F16L 29/00*    (2006.01)
(Continued)

(52) U.S. Cl.
CPC .......... *F17C 13/025* (2013.01); *F16L 29/002* (2013.01); *F16L 41/008* (2013.01);
(Continued)

(58) Field of Classification Search
CPC ......... A62C 37/50; A62C 35/68; A62C 13/64; A62C 13/76; A62C 13/78; A62C 13/10;
(Continued)

(56) References Cited

U.S. PATENT DOCUMENTS 2,336,282 A * 12/1943 Mueller .................. F16K 1/306
137/614.14
6,047,743 A    4/2000 Byrd
(Continued)

FOREIGN PATENT DOCUMENTS

CN    202350994 U    7/2012
CN    204170318 U    2/2015
(Continued)

OTHER PUBLICATIONS

International Search Report mailed Jan. 28, 2020; International Application No. PCT/US2019/051381; International Filing Date Sep. 17, 2019 (7 pgs).

(Continued)

*Primary Examiner* — Christopher R Dandridge
(74) *Attorney, Agent, or Firm* — Honigman LLP

(57) ABSTRACT

A method of checking a pressure of an agent cylinder that includes coupling a gauge assembly to an outlet of a gauge tool, the gauge assembly having a pressure gauge and a vent valve movable between an open position and a closed position. The method further includes moving the vent valve towards the closed position; attaching a fill adapter defining an inlet of the gauge tool to a valve port of an agent cylinder; and actuating a drive member of the gauge tool in a first direction to move a valve member of the gauge tool from a first position towards a second position to facilitate a fluid flow between the inlet and the outlet of the gauge tool.

2 Claims, 4 Drawing Sheets

(51) Int. Cl.
*F16L 41/00* (2006.01)
*F17C 13/02* (2006.01)
*G01L 7/00* (2006.01)
*G01L 19/00* (2006.01)

(52) U.S. Cl.
CPC ............ *G01L 7/00* (2013.01); *G01L 19/0015* (2013.01); *A62C 37/50* (2013.01); *F17C 2205/0382* (2013.01); *F17C 2250/043* (2013.01)

(58) Field of Classification Search
CPC ....... A62C 37/46; G01L 7/00; G01L 19/0015; F16K 37/0041; Y10T 137/8326
See application file for complete search history.

(56) References Cited

U.S. PATENT DOCUMENTS

| | | | |
|---|---|---|---|
| 6,073,909 | A | 6/2000 | Danielson et al. |
| 8,910,504 | B2 | 12/2014 | Zlatintsis |
| 9,366,350 | B2* | 6/2016 | Li .......................... F16K 1/305 |
| 9,606,013 | B2 | 3/2017 | McSheffrey, Jr. et al. |
| 2015/0041158 | A1* | 2/2015 | Stumm .................. A62C 37/10 169/19 |
| 2016/0067535 | A1 | 3/2016 | Alexander et al. |
| 2017/0248274 | A1 | 8/2017 | Ozaki et al. |

FOREIGN PATENT DOCUMENTS

| | | |
|---|---|---|
| CN | 204573229 U | 8/2015 |
| CN | 105727481 A | 7/2016 |
| CN | 207168872 U | 4/2018 |
| DE | 202015003967 U1 | 9/2016 |
| DE | 102015007088 A1 | 12/2016 |
| EP | 0788815 B1 | 5/2000 |
| EP | 2199771 A1 | 6/2010 |
| FR | 2796124 A1 | 1/2001 |
| GB | 1479685 A | 7/1977 |
| GB | 2496096 A | 5/2013 |
| JP | 2017086398 A | 5/2017 |
| WO | 2011013932 A2 | 2/2011 |

OTHER PUBLICATIONS

Written Opinion mailed Jan. 28, 2020; International Application No. PCT/US2019/051381; International Filing Date Sep. 17, 2019 (13 pgs).

Koorsen Fire & Security, "What is Hydrostatic Testing of Portable ABC Fire Extinguishers??", Oct. 15, 2018, available at: https://blog.koorsen.com/what-is-hydrostatic-testing-of-portable-abc-fire-extinguishers, 17 pages.

Chinese Office Action for Application No. 201980041315.1; Issued Oct. 20, 2022; 10 Pages.

* cited by examiner

CALIBRATED GAUGE TOOL FOR CHECKING PRESSURES ON INSTALLED INERT SYSTEMS PER NFPA

BACKGROUND

Fire protection systems may be provided with containers housing a pressurized extinguishing agent. National Fire Protection Association (NFPA) standards require that the pressure of the container be checked within predetermined intervals, such as semi-annually. The current methods to check the pressure of the container may require the intentional leaking of the pressurized gas past a sealing member that may temporarily stretch or displace the sealing member leading to wear and eventual replacement of the sealing member.

BRIEF DESCRIPTION

Disclosed is a gauge tool that includes a valve body, a valve member, and a drive member. The valve body extends along a first axis between a first valve body end and a second valve body end. The valve body defines a valve seat, an inlet that extends through the valve seat along the first axis, and an outlet extending along a second axis that is disposed transverse to the first axis. The valve member is movably disposed within the valve body. The valve member extends between a first valve member end and a second valve member end along the first axis. The drive member is connected to the second valve member end. Responsive to actuation of the drive member relative to the first axis, the valve member is movable relative to the valve seat between a first position that inhibits a fluid flow between the inlet and the outlet and a second position that facilitates the fluid flow between the inlet and the outlet.

In addition to one or more of the features described above, or as an alternative to any of the foregoing embodiments, the valve member includes a protrusion that extends from the first valve member end and extends into the inlet.

In addition to one or more of the features described above, or as an alternative to any of the foregoing embodiments, the inlet is arranged to connect to a valve port of an agent cylinder.

In addition to one or more of the features described above, or as an alternative to any of the foregoing embodiments, a gauge assembly is connected to the outlet, the gauge assembly is arranged to check a pressure of the agent cylinder while the drive member is in the second position and the protrusion engages a check valve in the valve port of the agent cylinder.

Also disclosed is a gauge tool that includes a valve body that extends between a first valve body end and a second valve body end along a first axis. The valve body defines an inlet that extends through a valve seat disposed proximate the first valve body end. The valve body further defines a chamber disposed proximate the second valve body end, a cavity extending between the inlet and the cavity, and an outlet that extends along a second axis into the cavity.

In addition to one or more of the features described above, or as an alternative to any of the foregoing embodiments, a valve member extending along the first axis between a first valve member end and a second valve member end that extends into the chamber, the valve member end having a protrusion that extends into the inlet.

In addition to one or more of the features described above, or as an alternative to any of the foregoing embodiments, a drive member connected to the second valve member end and extending into the chamber.

In addition to one or more of the features described above, or as an alternative to any of the foregoing embodiments, an end plate disposed on the second valve body end and defining an opening through which the drive member extends.

In addition to one or more of the features described above, or as an alternative to any of the foregoing embodiments, the valve body defines a fill adapter that is arranged connect to a valve port of an agent cylinder having a check valve.

In addition to one or more of the features described above, or as an alternative to any of the foregoing embodiments, responsive to rotation of the drive member about the first axis, the valve member moves between a first position in which the first valve member end is spaced apart from the check valve of the agent cylinder and a fluid flow from the agent cylinder is inhibited from flowing between the inlet and the outlet and a second position in which the first valve member engages the check valve of the agent cylinder and the fluid flow from the agent cylinder flows between the inlet and the outlet.

Further disclosed is a method of checking a pressure of an agent cylinder that includes coupling a gauge assembly to an outlet of a gauge tool, the gauge assembly having a pressure gauge and a vent valve movable between an open position and a closed position. The method further includes moving the vent valve towards the closed position; attaching a fill adapter defining an inlet of the gauge tool to a valve port of an agent cylinder; and actuating a drive member of the gauge tool in a first direction to move a valve member of the gauge tool from a first position towards a second position to facilitate a fluid flow between the inlet and the outlet of the gauge tool.

In addition to one or more of the features described above, or as an alternative to any of the foregoing embodiments, the fluid flow is facilitated between the inlet and the outlet of the gauge tool while a protrusion of the valve member engages a check valve in the valve port of the agent cylinder.

In addition to one or more of the features described above, or as an alternative to any of the foregoing embodiments, measuring a pressure of the agent cylinder via the pressure gauge.

In addition to one or more of the features described above, or as an alternative to any of the foregoing embodiments, actuating the drive member of the gauge tool in a second direction to move the valve member of the gauge tool from the second position towards the first position to inhibit the fluid flow between the inlet and the outlet of the gauge tool.

In addition to one or more of the features described above, or as an alternative to any of the foregoing embodiments, the fluid flow is inhibited between the inlet and the outlet of the gauge tool while a protrusion of the valve member is spaced apart from a check valve in the valve port of the agent cylinder.

In addition to one or more of the features described above, or as an alternative to any of the foregoing embodiments, moving the vent valve from the closed position towards the open position; and venting the gauge tool through the vent valve.

In addition to one or more of the features described above, or as an alternative to any of the foregoing embodiments, removing the fill adapter from the valve port of the agent cylinder.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 2:
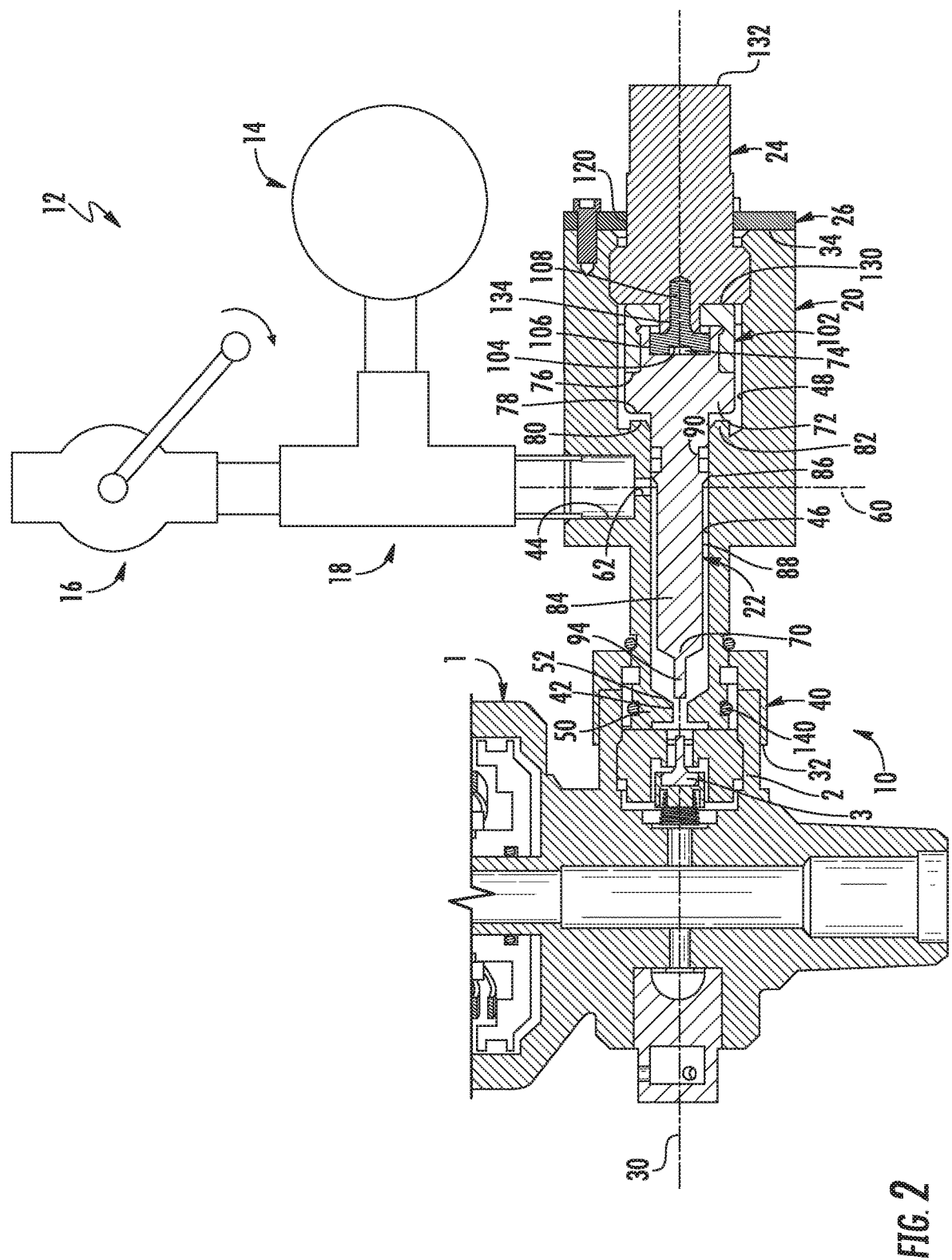
FIG. 2 is a section view of the gauge tool coupled to the gauge assembly with the gauge tool in a first position.
Figure 3:
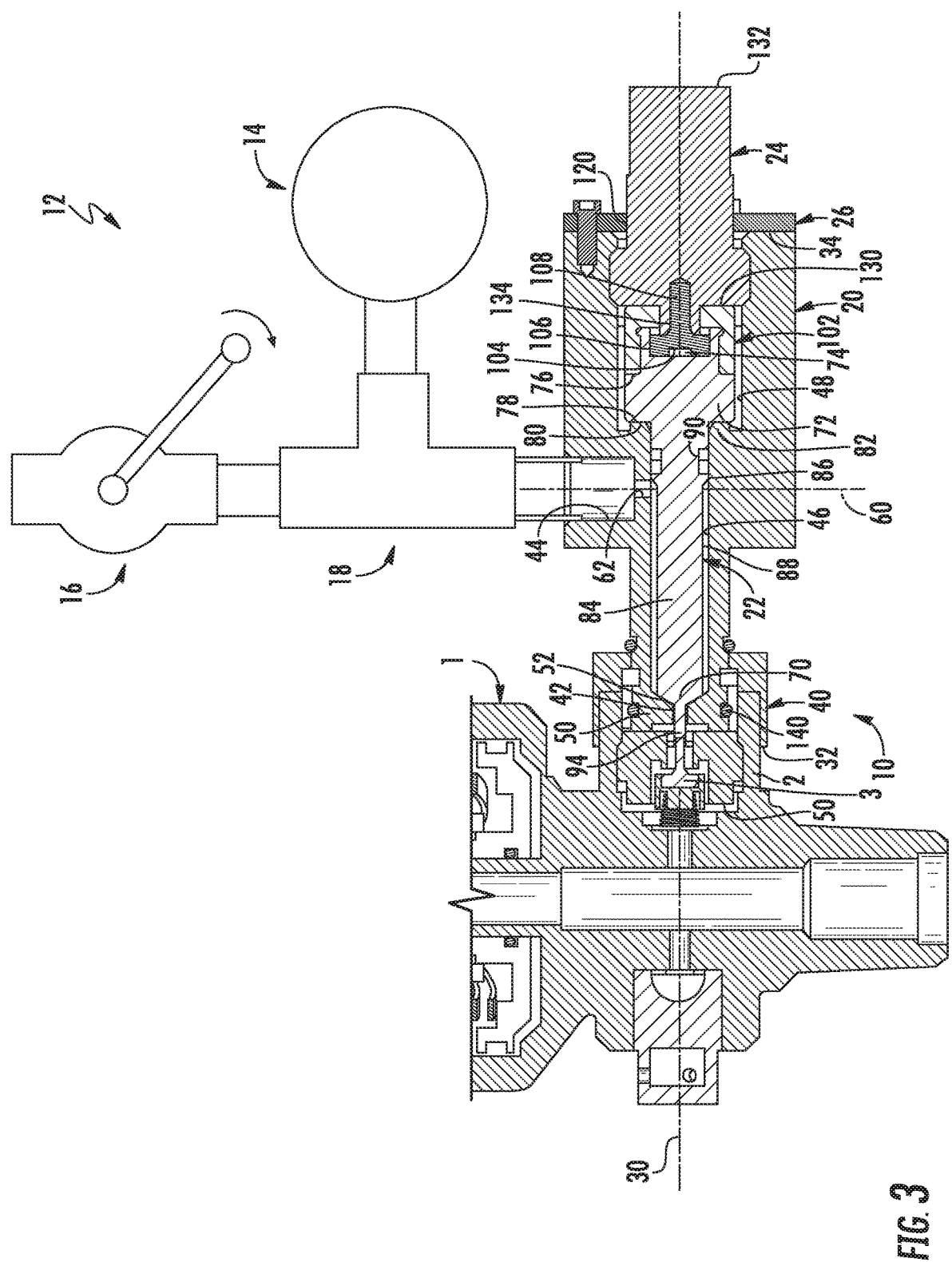
FIG. 3 is a section view of the gauge tool coupled to the gauge assembly with the gauge tool in a second position.
Figure 4:
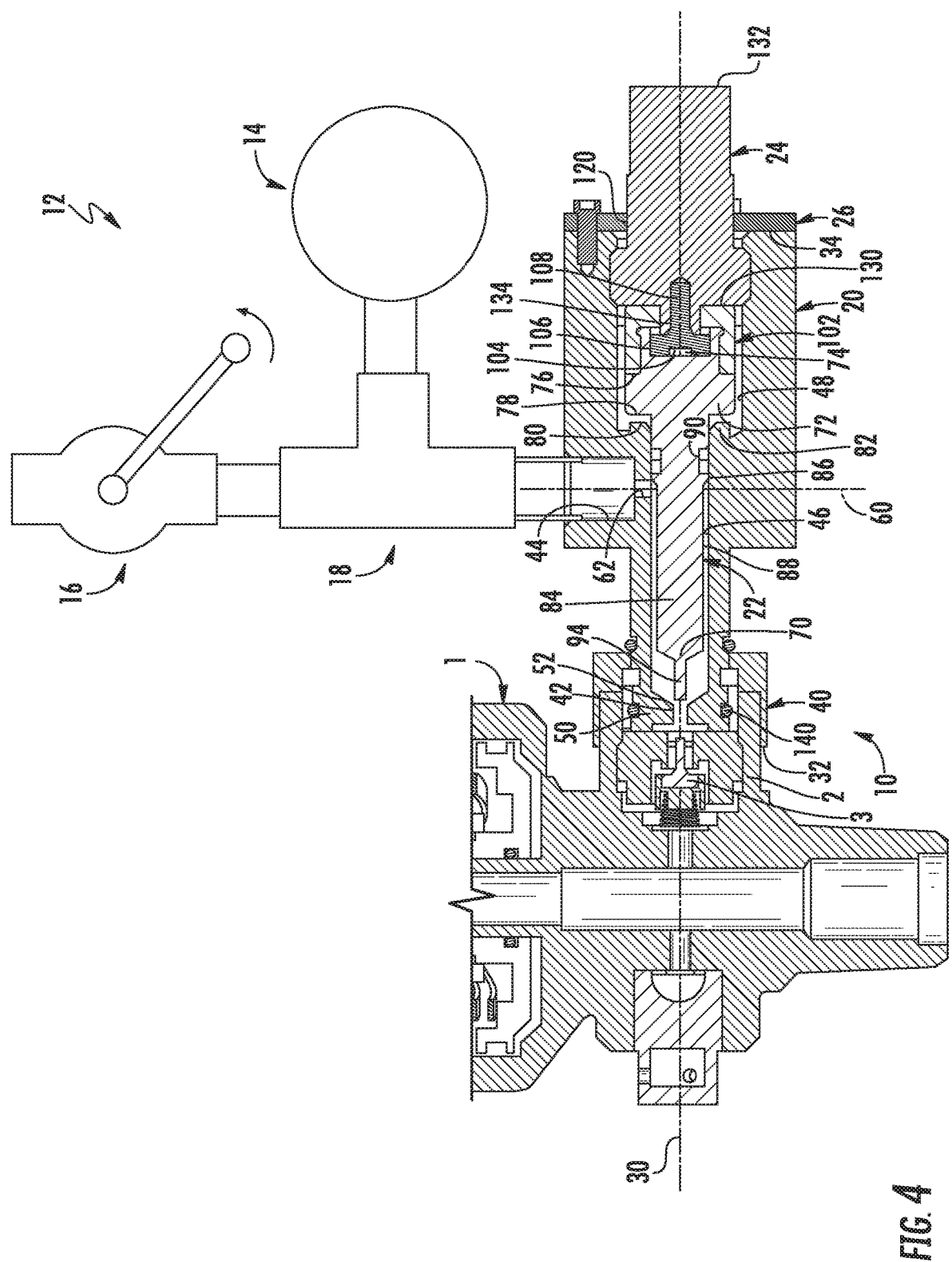
FIG. 4 is a section view of the gauge tool coupled to the gauge assembly with the gauge tool returned to the first position and the gauge assembly in a vent position.

Referring to FIGS. 2-4, fire protection systems may be provided with a container, such as an agent cylinder 1 that contains a pressurized extinguishing agent or pressurized inerting agent. The agent cylinder 1 may be provided with a valve port or cylinder valve 2 containing a check valve 3 that facilitates testing or checking of the internal pressure of the agent cylinder 2 in accordance with NFPA standards.

Figure 1:
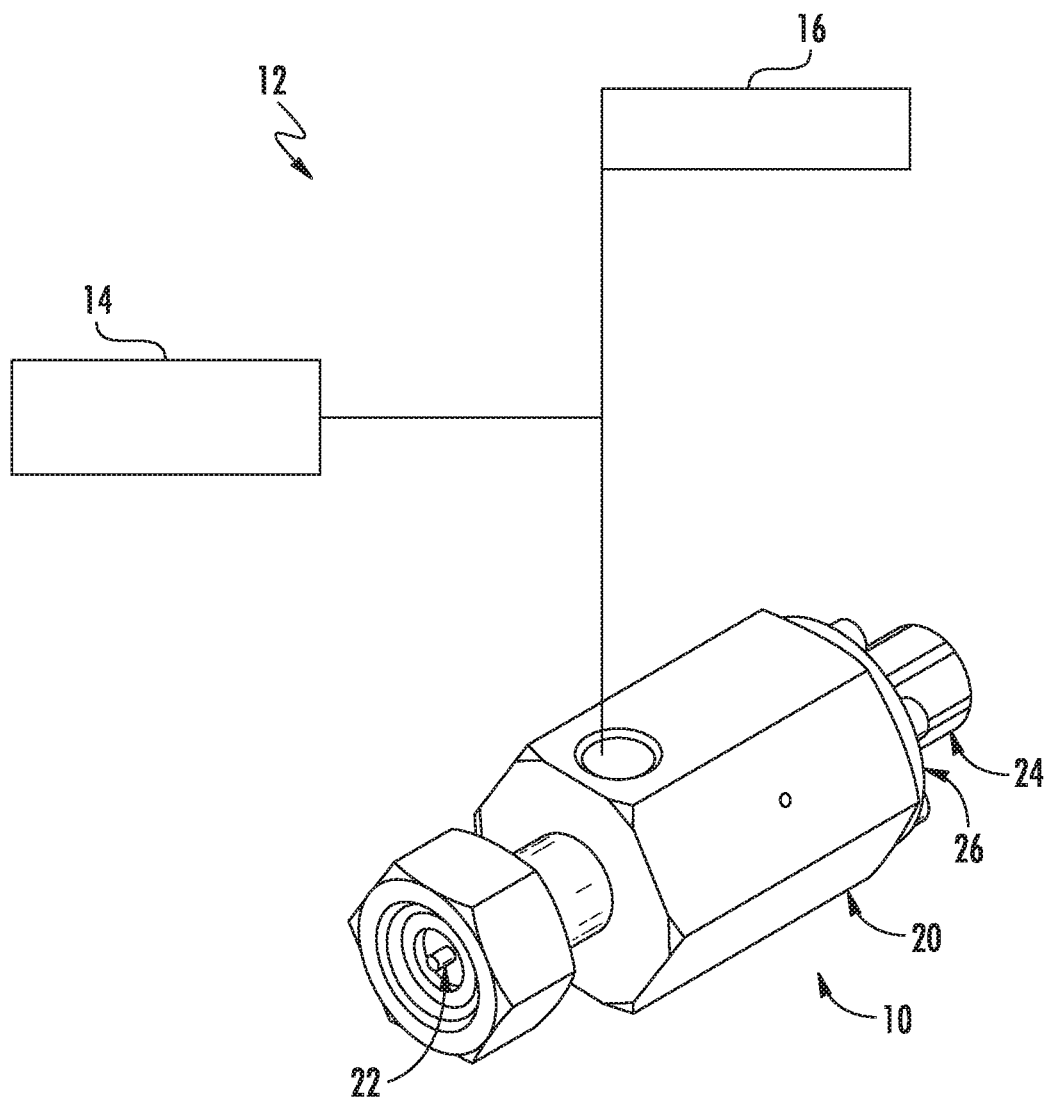
FIG. 1 is a schematic illustration of a gauge tool coupled to a gauge assembly.

Referring to FIG. 1, a gauge tool 10 may be provided to interface with the valve port or cylinder valve 2 of the agent cylinder 1 to facilitate the checking of the internal pressure of the agent cylinder 1. The gauge tool 10 may interface with a gauge assembly 12 that is arranged to check a pressure of the agent cylinder 1. The gauge assembly 12 includes a pressure gauge or calibrated gauge 14 and a vent valve 16. The calibrated gauge 14 of the gauge assembly 12 provides a pressure reading of the internal pressure of the agent cylinder 1. The vent valve 16 is movable between a closed position and a vent/open position to enable the gauge tool 10 and the gauge assembly 12 to be vented to the atmosphere. A connector 18, such as a tee connector, is fluidly connected to the calibrated gauge 14 and the vent valve 16 and enables the gauge assembly 12 to be connected to the gauge tool 10.

Referring to FIGS. 1-4, the gauge tool 10 includes a valve body 20, a valve member 22, a drive member 24, and an end plate 26.

Referring to FIGS. 2-4, the valve body 20 extends along a first axis 30 between a first valve body end 32 and a second valve body end 34. The valve body 20 defines a fill adapter 40, an inlet 42, an outlet 44, a cavity 46, and a chamber 48.

The fill adapter 40 is disposed at the first valve body end 32. The fill adapter 40 is arranged interface with and connect to the valve port or cylinder valve 2 of the agent cylinder 1. The inlet 42 is defined by a portion 50 of the valve body 20 that extends into or is disposed within the fill adapter 40. The inlet 42 extends through a valve seat 52 that is defined by the portion 50 of the valve body 20 along the first axis 30. The valve seat 52 is disposed proximate the first valve body end 32. The inlet 42 is arranged to selectively receive a fluid flow from the agent cylinder 1 and direct the fluid flow towards the gauge assembly 12 that may be connected to the outlet 44.

The outlet 44 extends along a second axis 60 that is disposed transverse to the first axis 30. The outlet 44 extends into the cavity 46 that extends between the chamber 48 and the inlet 42 along the first axis 30. The outlet 44 includes a port 62 that extends towards the cavity 46. The port 62 has a cross-sectional form that is less than the cross-sectional form of the outlet 44 and the cavity 46.

The cavity 46 and the port 62 fluidly connect the inlet 42 and the outlet 44 based on the position of the valve member 22. The fluid connection between the inlet 42 and the outlet 44 enables a fluid flow from the agent cylinder 1 to flow through the outlet 44 and into the gauge assembly 12 to enable the calibrated gauge 14 to provide a pressure reading of the agent cylinder 1.

The chamber 48 is disposed proximate the second valve body end 34 and is disposed between the cavity 46 and the second valve body end 34. The cavity 46 may have a first cross-sectional form and the chamber 48 may have a second cross-sectional form. The first cross-sectional form of the cavity 46 may be less than the second cross-sectional form of the chamber 48.

The valve member 22 is movably disposed within the valve body 20 along the first axis 30. The valve member 22 extends between a first valve member end 70 and a second valve member end 72 along the first axis 30. The first valve member end 70 is arranged to move relative to the valve seat 52 responsive to movement of the valve member 22 along the first axis 30. The second valve member end 72 extends into the chamber 48. The second valve member end 72 may be arranged as an enlarged head that defines a pocket 74, a first shoulder 76, and a second shoulder 78. The pocket 74 extends along the first axis 30 towards the first valve member end 70. The first shoulder 76 extends about the enlarged head of the valve member 22. The second shoulder 78 is axially spaced apart from the first shoulder 76 along the first axis 30 and extends about the enlarged head of the valve member 22. The second shoulder 78 is arranged to selectively engage an end surface 80 of a feature 82 of the valve body 20 that extends into the chamber 48 responsive to movement of the valve member 22 along the first axis 30. The second shoulder 78 is disposed generally parallel to the first shoulder 76.

The valve member 22 includes a valve member body 84 that extends between the first valve member end 70 and the enlarged head of the second valve member end 72 along the first axis 30. The valve member body 84 extends through the cavity 46. The valve member body 84 includes a perturbation or a wing 86 that radially or circumferentially extends about an exterior surface 88 the valve member body 84 and an o-ring gland and seal 90 that extends from the exterior surface 88 towards the first axis 30. The o-ring gland and seal 90 fluidly isolates the cavity 46 from the chamber 48 such that the chamber 48 is not pressurized while the cavity 46 is pressurized.

The valve member 22 includes a protrusion 94 that extends from the first valve member end 70 into the inlet 42. The protrusion 94 engages the check valve 3 in the valve port or cylinder valve 2 of the agent cylinder 1 to allow for pressurization of the cavity 46 of the gauge tool, calibrated gauge 14, and vent valve 16 via port 62 and connector 18.

The valve member 22 is movable between a first position and a second position along the first axis 30 responsive to actuation of the drive member 24. The first position of the valve member is a position in which the protrusion 94 is fully retracted and does not engage the check valve 3 in the cylinder valve 2 as shown in FIGS. 2 and 4. While the valve member 22 is in the first position a fluid flow from the agent cylinder 1 is inhibited from flowing between the inlet 42 and the outlet 44. The second position of the valve member 22 is a position which the protrusion 94 extends through the inlet 42 and engages the check valve 3 in the cylinder valve 2 as shown in FIG. 3. While the valve member 22 is in the second position, a fluid flow from the agent cylinder 1 is facilitated or enabled to flow through bores defined within the valve seat 52 and flow into the cavity 46 then flows between the inlet 42 and outlet 44 and into the gauge assembly 12.

The drive member 24 is connected to the second valve member end 72 through a coupling assembly. The coupling assembly includes a coupler 102 and a fastener 104. The coupler 102 is disposed within the chamber 48. The coupler 102 is disposed about a portion of the second valve member end 72 and engages the first shoulder 76 of the enlarged head. The fastener 104 includes a fastener head 106 that is received within the pocket 74 of the valve member 22. The fastener 104 includes a fastener shank or fastener body 108 that extends from the fastener head 106 and extends into the drive member 24 to couple the drive member 24 to the valve member 22.

The drive member 24 extends through an opening 120 of the end plate 26 that is connected to the second valve body end 34. The drive member 24 extends into the chamber 48 of the valve body 20 along the first axis 30. The drive member 24 extends between a first drive member end 130 and a second drive member end 132 along the first axis 30. The drive member 24 defines an adapter 134 that extends from the first drive member end 130 towards the second valve member end 72. The adapter 134 extends into the coupler 102 and the fastener body 108 of the fastener 104 of the coupling assembly extends into the adapter 134.

The drive member 24 is arranged to be actuated to move the valve member 22 between the first position and the second position. The drive member 24 may be actuated by rotation of the drive member 24 about the first axis 30, by pivoting of the drive member 24 relative to the first axis 30, or may be otherwise translated along the first axis 30 to move the valve member 22 between the first position and the second position.

The pressure of the agent cylinder 1 may be checked using the following process or method. The connector 18 of the gauge assembly 12 may be inserted into, connected to, or coupled to the outlet 44 of the valve body 20 of the gauge tool 10. The vent valve 16 of the gauge assembly 12, which is movable between an open/vent position and a closed position, is moved towards the closed position, as shown in FIG. 2. The valve member 22 may be moved towards the first position, should the valve member 22 not be in the first position.

The fill adapter 40 of the gauge tool 10 may be connected to the valve port or cylinder valve 2 of the agent cylinder 1. Responsive to actuation of the drive member 24 relative to the first axis 30 in a first direction, the valve member 22 moves from the first position towards the second position to facilitate a fluid flow from the agent cylinder 1 between the inlet 42 and the outlet 44 of the gauge tool 10, as shown in FIG. 3. The fluid flow through the outlet 44 of the gauge tool enters the connector 18 of the gauge assembly 12 to enable the measurement of a pressure of the agent cylinder 1 by the calibrated gauge 14. The pressure of the agent cylinder 1 may be read by an operator or provided to a data recording system. The drive member 24 may be actuated in a second direction that is disposed opposite the first direction to move the valve member 22 from the second position towards the first position, such that the protrusion 94 disengages from the check valve 3 in the valve port or cylinder valve 2 to inhibit the fluid flow from the agent cylinder 1 between the inlet 42 and the outlet 44 of the gauge tool 10, as shown in FIG. 4.

The vent valve 16 of the gauge assembly 12 may be moved from the closed position towards the open or vent position, as shown in FIG. 4. The cavity 46 of the gauge tool 10 as well as the gauge assembly 12 may be vented to atmosphere through the vent valve 16. Subsequent to the venting of the gauge tool 10 and the gauge assembly 12, the fill adapter 40 may be removed from the valve port or cylinder valve 2 of the agent cylinder 1.

The gauge tool 10 is arranged to overcome the traditional testing methods that may result in the wear or replacement of the sealing member, such as an o-ring 140 that is provided on a portion 50 of valve body 20, as shown in FIGS. 2-4. The gauge tool 10 is arranged to be pressurized and depressurized without popping the pressure within the agent cylinder 1 past the sealing member, to extend the o-ring life on portion 50 of valve body 20. Additionally, the gauge tool 10 enables the agent cylinder 1 to be tested or pressure checked with a greatly decreased noise level by avoiding the popping associated with traditional testing methods.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   an agent cylinder, comprising a valve port and a check valve in the valve port; and
   a gauge tool having an inlet arranged to removably connect to the valve port of the agent cylinder,
   the gauge tool, comprising:
   a valve body extending along a first axis between a first valve body end and a second valve body end, the valve body defining a valve seat, the inlet extending through the valve seat along the first axis, and an outlet extending along a second axis that is disposed transverse to the first axis;
   a valve member movably disposed within the valve body, the valve member extending between a first valve member end and a second valve member end along the first axis; and
   a drive member connected to the second valve member end, responsive to actuation of the drive member relative to the first axis, the valve member is movable relative to the valve seat between a first position that inhibits a fluid flow between the inlet and the outlet and a second position that facilitates the fluid flow between the inlet and the outlet;

wherein the gauge tool is configured such that the fluid flow is facilitated between the inlet and the outlet of the gauge tool upon a protrusion of the valve member engaging the check valve in the valve port of the agent cylinder;

and the gauge tool is configured such that the fluid flow is inhibited between the inlet and the outlet of the gauge tool upon the protrusion of the valve member being spaced apart from the check valve in the valve port of the agent cylinder.

2. The system of claim 1, further comprising a gauge assembly connected to the outlet of the gauge tool, wherein the gauge assembly is arranged to check a pressure of the agent cylinder while the drive member of the gauge tool is in the second position and the protrusion engages the check valve in the valve port of the agent cylinder.

* * * * *